United States Patent
DeLuca et al.

(10) Patent No.: US 10,652,182 B1
(45) Date of Patent: May 12, 2020

(54) UNLOCKING EMOTICONS BASED ON PROFESSIONAL SKILLS

(71) Applicant: INTERNATIONAL BUSINESS MACHINES CORPORATION, Armonk, NY (US)

(72) Inventors: Lisa Seacat DeLuca, Baltimore, MD (US); Kelley Anders, East New Market, MD (US); Jeremy R. Fox, Georgetown, TX (US); Jeremy A. Greenberger, San Jose, CA (US)

(73) Assignee: International Business Machines Corporation, Amronk, NY (US)

( * ) Notice: Subject to any disclaimer, the term of this patent is extended or adjusted under 35 U.S.C. 154(b) by 0 days.

(21) Appl. No.: 16/177,547

(22) Filed: Nov. 1, 2018

(51) Int. Cl.
| | |
|---|---|
| *H04L 12/58* | (2006.01) |
| *G06F 3/0481* | (2013.01) |
| *H04L 29/08* | (2006.01) |
| *G06F 16/58* | (2019.01) |

(52) U.S. Cl.
CPC .......... *H04L 51/10* (2013.01); *G06F 3/04817* (2013.01); *G06F 16/5866* (2019.01); *H04L 51/32* (2013.01); *H04L 67/306* (2013.01)

(58) Field of Classification Search
CPC ....... H04L 51/10; H04L 51/32; H04L 67/306; G06F 16/5866; G06F 3/04817
See application file for complete search history.

(56) References Cited

U.S. PATENT DOCUMENTS

2010/0293473 A1\* 11/2010 Borst .................. H04L 12/1827
715/741
2016/0085773 A1 3/2016 Chang et al.
2016/0110058 A1\* 4/2016 Leydon ................. G06F 3/0236
715/773
2016/0260064 A1 9/2016 Ahmed et al.
2017/0075978 A1 3/2017 Zhang et al.

OTHER PUBLICATIONS

Acclaim, "Acclaim is joining Credly", https://www.youracclaim.com/, accessed on Jul. 11, 2018, pp. 1-6.
LinkedIn, "Skill Endorsements—Overview", LinkedIn Help, https://www.linkedin.com/help/linkedin/answer/31888/skill-endorsement, accessed Jul. 11, 2018, pp. 1-2.
Mell, et al., "The NIST Definition of Cloud Computing," National Institute of Standards and Technology, U.S. Department of Commerce, Special Publication 800-145, Sep. 2011, pp. 1-7.

\* cited by examiner

*Primary Examiner* — Michael A Keller
(74) *Attorney, Agent, or Firm* — Michael O'Keefe

(57) ABSTRACT

Embodiments of the present invention disclose a method, computer program product, and system for unlocking emoticons based on professional skills. The computer may receive a user message or an emoticon database search term from a user, wherein a user's professional skill and an associated emoticon is determined based on the user message or the emoticon database search term. A plurality of user professional skills may be retrieved from a professional skills site. It may be determined whether a number of endorsements for the user's professional skill exceeds a threshold value, wherein the threshold value is set for each emoticon in an emoticon database. In response to it being determined that the number of endorsements for the user's professional skill does exceed the threshold value, an unlocking action may be performed that gives the user access to the associated emoticon in one or more messaging applications based on the determination.

20 Claims, 6 Drawing Sheets

UNLOCKING EMOTICONS BASED ON PROFESSIONAL SKILLS

BACKGROUND

The present invention relates generally to the field of computing, and more particularly to unlocking emoticons.

Today, individuals interact through a number of collaboration tools such as instant messaging and social networking sites. Currently, those sites allow all users to have access to all emoticons. Emoticons are pictorial representations of a facial expression using characters, a symbol, or an object. Individuals use emoticons in messages and social networking posts.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for unlocking emoticons based on professional skills. The computer may receive a user message or an emoticon database search term from a user, wherein a user's professional skill and an associated emoticon is determined based on the user message or the emoticon database search term. A plurality of user professional skills may be retrieved from a professional skills site. It may be determined whether a number of endorsements for the user's professional skill exceeds a threshold value, wherein the threshold value is set for each emoticon in an emoticon database. In response to it being determined that the number of endorsements for the user's professional skill does exceed the threshold value, an unlocking action may be performed that gives the user access to the associated emoticon in one or more messaging applications based on the determination.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
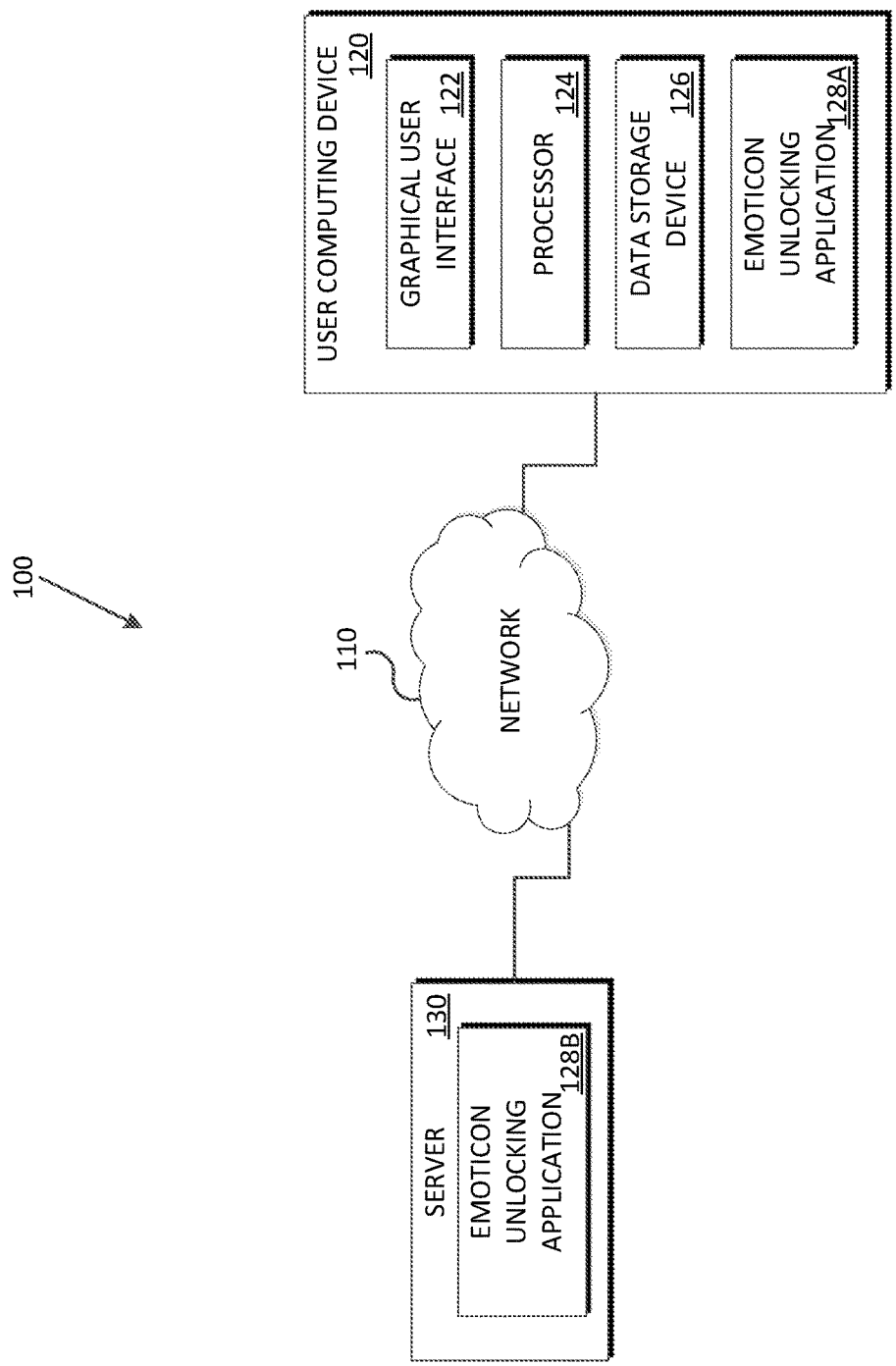
FIG. 1 illustrates an exemplary networked computer environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to unlocking emoticons. The following described exemplary embodiments provide a system, method, and program for, among other things, an emoticon unlocking application that can unlock emoticons for a user based on professional social skills. Therefore, the present invention has the capacity to improve the technical field of computer functionality by more accurately representing information.

As previously described, today, individuals interact through a number of collaboration tools such as instant messaging and social networking sights. Currently, those sites allow all users to have access to all emoticons. Emoticons are pictorial representations of a facial expression using characters, a symbol, or an object. Individuals use emoticons in messages and social networking posts.

Individuals use emoticons when messaging and writing social media posts. When an individual uses an emoticon, it is difficult to trust the individual's credentials and knowledge on the topic in which they are messaging or posting about. As such, it may be advantageous to, among other things, implement a system to gamify the use of emoticons and unlock those emoticons that are associated with professional skills. This will allow individuals to show their knowledge on a specific topic without having to refer to a professional skills website. Unique emoticons show distinctive expertise in collaborative tools.

According to one embodiment, the emoticon unlocking application may allow a user to use specific emoticons related to their professional skills. The emoticon unlocking application may link a messaging client to a professional skills site, such as LinkedIn® (LinkedIn and all LinkedIn-related trademarks and logos are trademarks or registered trademarks of LinkedIn Corporation and/or its affiliates), Slackoverflow® (Slack and all Slack-related trademarks and logos are trademarks or registered trademarks of Slack Technologies and/or its affiliates), or other professional skills sites. Upon receiving a user's message or post or the user's search in an emoticon database, the emoticon unlocking application may retrieve a user's professional skills from a professional skills site. The skills on the professional skills site may be manually entered by the user, voted on by peers, or automated based on memberships, or user activity on the professional skills-related sites or communities. The emoticon unlocking application may determine whether the number of endorsements on a user's professional skill exceeds a threshold value. The system may set a threshold for the number of votes for a skill before an emoticon is unlocked. The threshold may be set individually for each emoticon or there may be a minimum threshold across the system. When the number of endorsements exceeds the threshold, the emoticon unlocking application may unlock the emoticon and display it in the messaging client. The user may then use the emoticon. When the number of endorsements does not exceed the threshold, the emoticon unlocking application may send a message to the user saying that the emoticon is locked. The message may also contain information on how to unlock the emoticon and information on how far away the user is from unlocking the emoticon.

Referring to FIG. 1, a functional block diagram illustrating a system for an emoticon unlocking application 100 is depicting, according to at least one embodiment. The system for the emoticon unlocking application 100 may include a user computing device 120 and a server 130 interconnected via a network 110.

The network 110 may include various types of communication networks, such as a wide area network (WAN), a local area network (LAN), a telecommunication network, a wireless network, a public switched network and/or a satellite network. The network 110 may include connections, such as wire, wireless communication links, or fiber optic cables. It may be appreciated that FIG. 1 provides only an illustration of one implementation and does not imply any limitations with regard to the environment in which different embodiments may be based on design and implementation requirements.

The user computing device 120 may include a graphical user interface 122, a processor 124 and a data storage device 126 that is enabled to host and run a software program, and an emoticon unlocking application 128A, and communicate with the server 130 via the network 110, in accordance with one embodiment of the invention. The user computing device 120 may be, for example, a mobile device, a smart phone, a personal digital assistant, a netbook, a laptop computer, a tablet computer, a desktop computer, or any type of computing device capable of running a program or accessing a network. The user computing device 120 may include internal and external hardware components, as described in further detail below with respect to FIG. 4. In other embodiments, the server 130 may operate in a cloud computing environment, as described in further detail below with respect to FIG. 5 and FIG. 6.

The user computing device 120 represents a computing device that may include a user interface, for example, the graphical user interface 122. The graphical user interface 122 can be any type of application that contains an interface capable of displaying the messaging client, the emoticons, and messages from the emoticon unlocking application 128A, for example, the application can be a web application, a graphical application, or any other type of application/program that displays the messaging client, the emoticons, and the messages from the emoticon unlocking application 128A.

Figure 6:
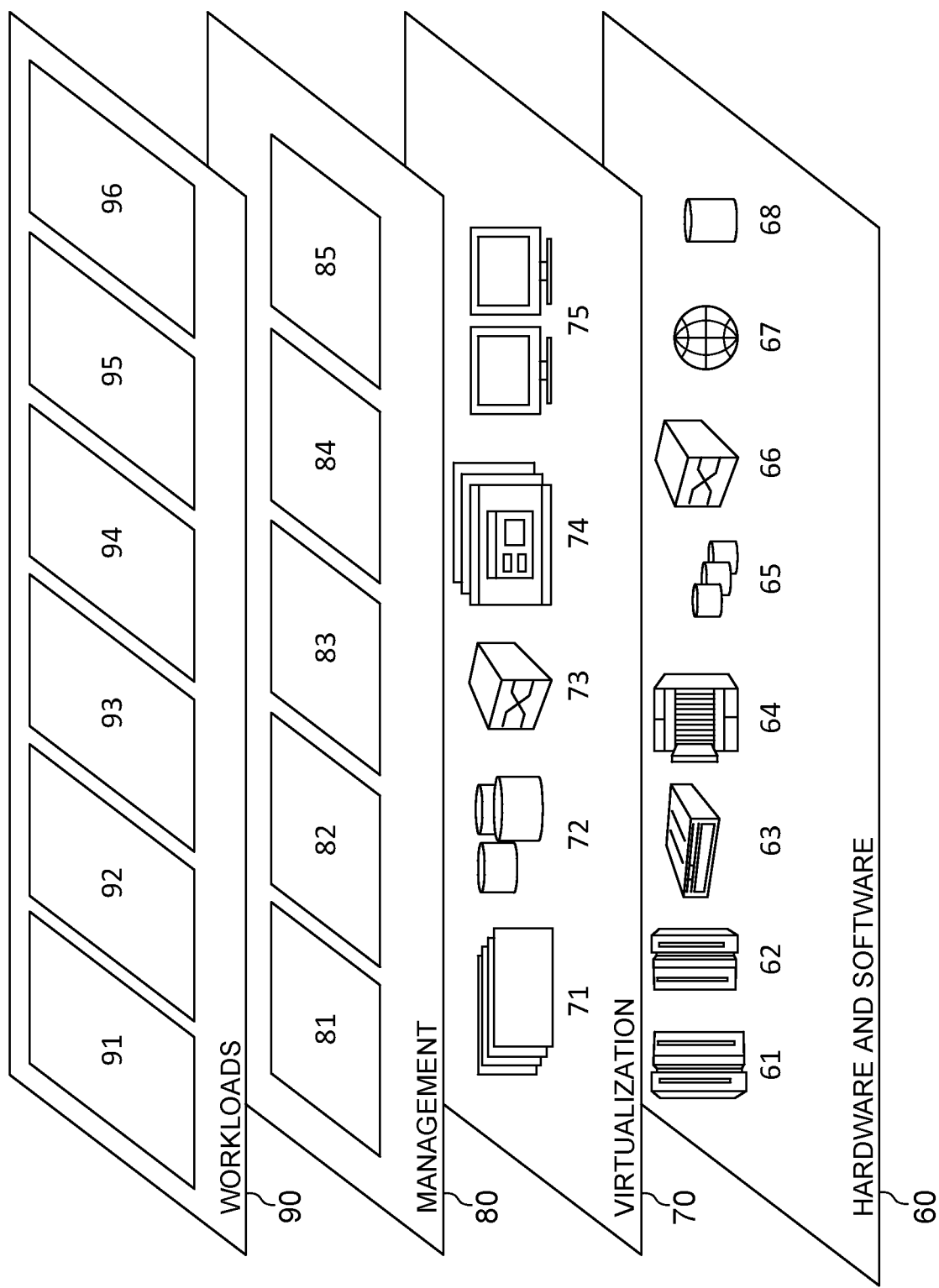
FIG. 6 depicts abstraction model layers according to an embodiment of the present invention.

The server 130 may be a laptop computer, a netbook computer, a personal computer (PC), a desktop computer, or any programable electronic device or any network of programable electronic devices capable of hosting and running an emoticon unlocking application 128B and communicating with the user computing device 120 via the network 110, in accordance with embodiments of the invention. The server 130 may include internal and external hardware components, as depicted and described in further detail below with respect to FIG. 4. In other embodiments, the server 130 may operate in a cloud computing environment, as depicted in FIG. 6 and FIG. 7.

The emoticon unlocking application 128B may contain an emoticon database 130. The emoticon database 130 may be a repository that stores a library of emoticons and their associated threshold values. The user may search for an emoticon using a keyword search.

The emoticon unlocking application 128A, 128B may link a messaging client to a professional skills site, such as LinkedIn®, Slackoverflow®, or other professional skills sites. The emoticon unlocking application 128A, 128B may receive a user message or emoticon search. Additionally, the emoticon unlocking application 128A, 128B may retrieve the user's professional skills from the professional skills site. The skills on the professional skills site may be manually entered by the user, voted on by peers, or automated based on memberships, or user activity on the professional skills-related sites or communities. Furthermore, the emoticon unlocking application 128A, 128B may determine whether the number of endorsements a user has on a particular skill exceeds the threshold value. The system may set a threshold for the number of votes for a skill before an emoticon can be unlocked. There may be a threshold for each skill or there may be a minimum threshold across the system. When the emoticon unlocking application 128A, 128B determines that the number of endorsements exceeds the threshold, the emoticon unlocking application 128A, 128B may display the emoticon in the messaging client. When the emoticon unlocking application 128A, 128B determines that the number of endorsements does not exceed the threshold, the emoticon unlocking application 128A, 128B may send a message to the user saying that the emoticon is locked. The emoticon unlocking application 128A, 128B may have the capability to act as a repository for emoticons and their associated thresholds. The emoticon unlocking application 128A, 128B may exist, either wholly or in part, on either the user computing device 120 or the server 130 or on both the user computing device 120 and the server 130.

Figure 2:
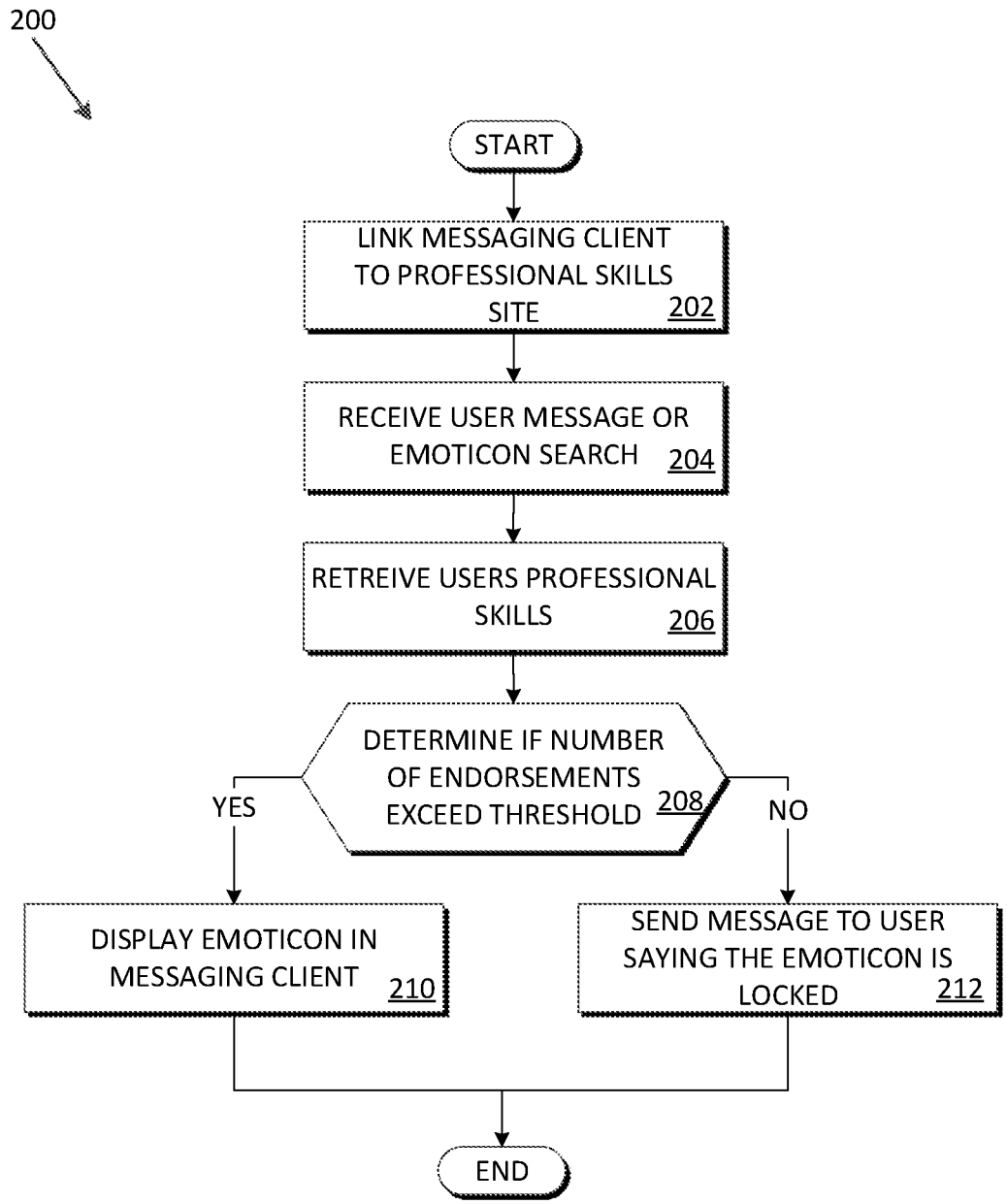
FIG. 2 illustrates an operational flowchart of an emoticon unlocking application, in accordance with an embodiment of the present invention.

FIG. 2 is an operational flowchart 200 illustrating of the system for the emoticon unlocking application 128A, 128B. At 202, the emoticon unlocking application 128A, 128B links a messaging client to a professional skills site. The professional skills site may be LinkedIn®, Slackoverflow®, or any other site that contains a user's professional skills. The user may make a selection on which professional skill site to link their messaging client to. For example, the user may link the messaging client they are using to LinkedIn®.

Then, at 204, the emoticon unlocking application 128A, 128B receives a user message or an emoticon search. From the received user message or emoticon search, the emoticon unlocking application 128A, 128B may determine which professional skill the user is referring to and what the associated emoticon is to that professional skill. The users message may be a chat message or a post on a social network. The system may associate a key word in the user message to an emoticon. There user could also lookup a skill through the emoticon database 130. For example, the user may write a message about a particular operating system and the emoticon unlocking application 128A, 128B may associate the particular operating system with an emoticon.

Next, at 206, the emoticon unlocking application 128A, 128B retrieves a user's professional skills from the professional skills site. The professional skills site may list a number of professional skills that the user is associated with. The skills within the professional skills site may be manually entered by the user, voted on by peers, or automated based on how long a user has been a member of an organization. The emoticon unlocking application 128A, 128B may capture social engagements of the user in order to gather the information needed to determine a user's skill. Additionally, the emoticon unlocking application 128A, 128B may import a user's profile from a professional skills site. For example, the emoticon unlocking application 128A, 128B may import a user's LinkedIn® profile and retrieve the user's listed skills. As an additional example, the emoticon unlocking application 128A, 128B may include in active membership on a particular professional skill site or community and the duration of the user's membership within the professional skills possessed by the user.

Then, at 208, the emoticon unlocking application 128A, 128B determines whether the number of endorsements on a user's professional skill exceeds the threshold. When the emoticon unlocking application 128A, 128B determines that the number of endorsements on a user's professional skill exceeds the threshold (step 208, "Yes" branch), the emoticon unlocking application 128A, 128B may continue to step 210 to display the emoticon in a messaging client. When the emoticon unlocking application 128A, 128B determines that the number of endorsements on a user's professional skill does not exceed the threshold (step 208, "No" branch), the emoticon unlocking application 128A, 128B may continue to step 212 to send a message to the client saying that the emoticon is locked. Endorsements may be votes by peers or peers expressing the user's expertise for a topic. Expertise may also be identified by job title, badges, and accredited accolades from a user's professional skills site. The threshold may be a predetermined value based on what value is considered to make a user skilled in a topic. The threshold may be set individually for each emoticon or there may be a minimum threshold across a system or a team. Additionally, the threshold may be based dynamically on the community. For example, there may be 100 people in a community so it may take two endorsements for the emoticon unlocking application 128A, 128B to unlock the specific emoticon. In at least one embodiment, the emoticon unlocking application 128A, 128B may consider user activity on the professional skills site in order to determine the endorsements listed for the user are justified. For example, the emoticon unlocking application 128A, 128B may determine an endorsement for a user's public speaking ability is justified based on the user having three conference speaking engagements listed on the user's calendar from the previous month.

Next, at 210, when the emoticon unlocking application 128A, 128B determines that the number of endorsements on a user's professional skill exceeds the threshold (step 208, "Yes" branch), the emoticon unlocking application 128A, 128B displays the emoticon in the messaging client. The emoticon unlocking application 128A, 128B unlocks the specific emoticon and the user can use the emoticon in the message or social network post. For example, the emoticon unlocking application 128A, 128B unlocks the emoticon relating to the specific operating system that the users message was discussing.

Then, at 212, when the emoticon unlocking application 128A, 128B determines that the number of endorsements on a user's professional skill does not exceed the threshold (step 208, "No" branch), the emoticon unlocking application 128A, 128B sends a message to the user saying that the emoticon is locked. The message that the emoticon unlocking application 128A, 128B sends to the user may contain information about how to unlock the emoticon and information about how far away they are from unlocking it. For example, the user may receive a rejection from the emoticon unlocking application 128A, 128B saying that they are one vote away from being able to unlock to emoticon.

It may be appreciated that FIG. 2 provides only an illustration of one implementation and does not imply any limitations with regard to how different embodiments may be implemented. Many modifications to the depicted environments may be made based on design and implementation requirements, such as steps or sub-steps occurring concurrently to each other. Additionally, in at least one embodiment, the emoticon unlocking application 128A, 128B may set a threshold for expiration on an emoticon. When a user isn't endorsed for a pre-determined amount of time, the emoticon unlocking application 128A, 128B may display the emoticon fading or locking again. For example, a user's professional skill may need to be endorsed at least once per year.

In an additional embodiment, the emoticon unlocking application 128A, 128B may change or update an emoticon. Users who have already achieved the emoticon may receive a message from the emoticon unlocking application 128A, 128B stating what has been changed or updated. For example, if the logo of an operating system changes, the emoticon unlocking application 128A, 128B may update the logo and send a message to the users who have achieved the emoticon saying that the logo has changed.

In a further embodiment, the emoticon unlocking application 128A, 128B may allow the emoticons to be enabled/disabled per post or message based on the user's skills. The specific skill referred to in the post or message may be analyzed and determined or manually set based on the user's degree of knowledge. The emoticon unlocking application 128A, 128B may be manually set when a user requires a higher degree of knowledge than the normal threshold value. For example, the emoticon unlocking application 128A, 128B may normally require two endorsements but the user requires a higher degree of knowledge for another user that they are chatting with to use the emoticon.

Figure 3:
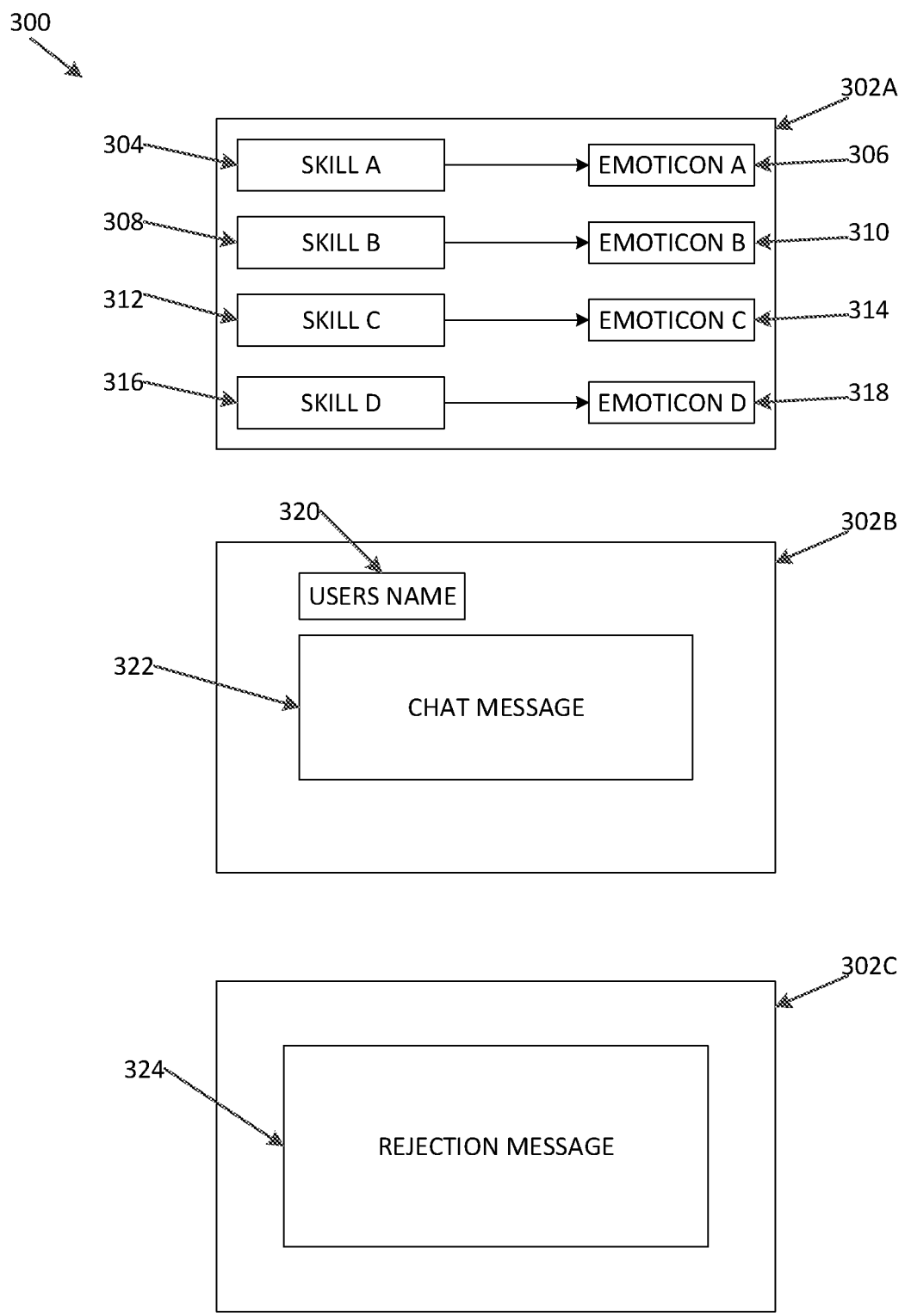
FIG. 3 is an operational flowchart of an example of a user interacting with the emoticon unlocking application, where the present invention can be implemented.

FIG. 3 illustrates an example of a functional block diagram 400 according to one embodiment of the invention. An initial display 302A, a secondary display 302B, and a final display 302C represent examples of a user interacting with the emoticon unlocking application 128A, 128B. The initial display 302A may contain a list of professional skills, such as, "Skill A" 304, "Skill B" 308, "Skill C" 312, and "Skill D" 316, and their associated emoticons, such as, "Emoticon A" 306, "Emoticon B" 310, "Emoticon C" 314, and "Emoticon D" 318. The professional skills may also contain their associated threshold value. The professional skills and associated emoticons may be stored in the emoticon database 130.

The secondary display 302B may contain a "user's name" 320 and a "chat message" 322. The emoticon unlocking application 128A, 128B may receive the "chat message" 322 from the user. The emoticon unlocking application 128A, 128B may analyze the "chat message" 322 in order to determine which professional skill the user is referring to. Additionally, the emoticon unlocking application 128A, 128B may use the "user's name" 320 to retrieve the user's professional skills from a professional skills site. Furthermore, the emoticon unlocking application 128A, 128B may determine whether the user has enough endorsements for the professional skills to unlock the emoticon. In response to this determination, the emoticon unlocking application 128A, 128B may either display the emoticon or send a rejection message.

The final display 302C may contain a "rejection message" 324. When the user does not have enough endorsements to exceed the threshold for the particular emoticon, the emoticon unlocking application 128A, 128B may send the "rejection message" 324. The "rejection message" 324 may include information on how to unlock the emoticon and on how far away they are from unlocking the emoticon.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

Figure 4:
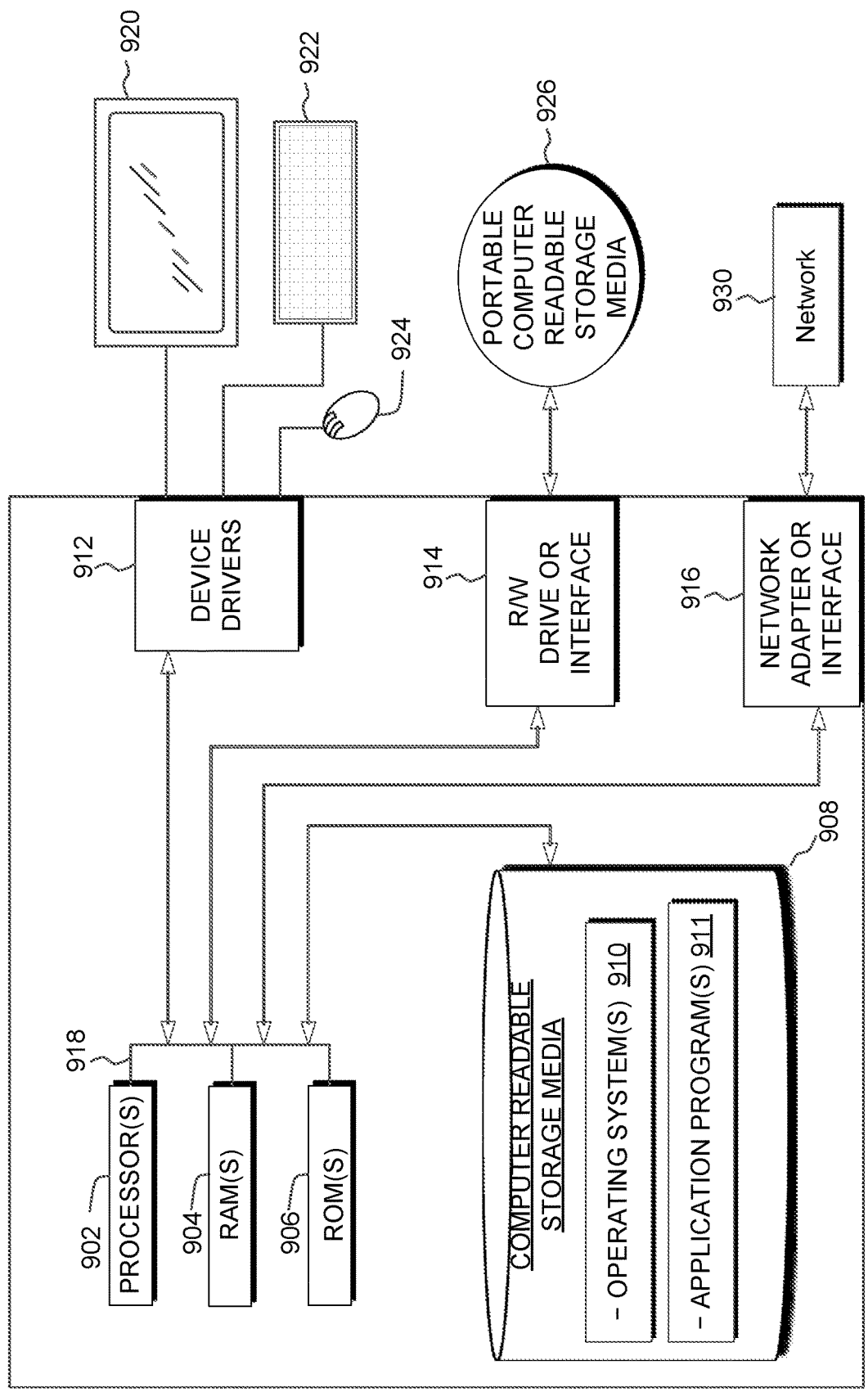
FIG. 4 is a block diagram of components of a computing device of the system for the emoticon unlocking application of FIG. 1, in accordance with embodiments of the present invention.

FIG. 4 depicts a block diagram of components of the user computing device 120 of the emoticon unlocking application 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The user computing device 120 and/or the server 130 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the emoticon unlocking application 128A, 128B (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The user computing device 120 and/or the server 130 may also include a R/W drive or interface 914 to read from and write to one or more portable computer readable storage media 926. Application programs 911 on the user computing device 120 and/or the server 130 may be stored on one or more of the portable computer readable storage media 926, read via the respective R/W drive or interface 914 and loaded into the respective computer readable storage media 908.

The user computing device 120 and/or the server 130 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the user computing device 120 and/or the server 130 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

The user computing device 120 and/or the server 130 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
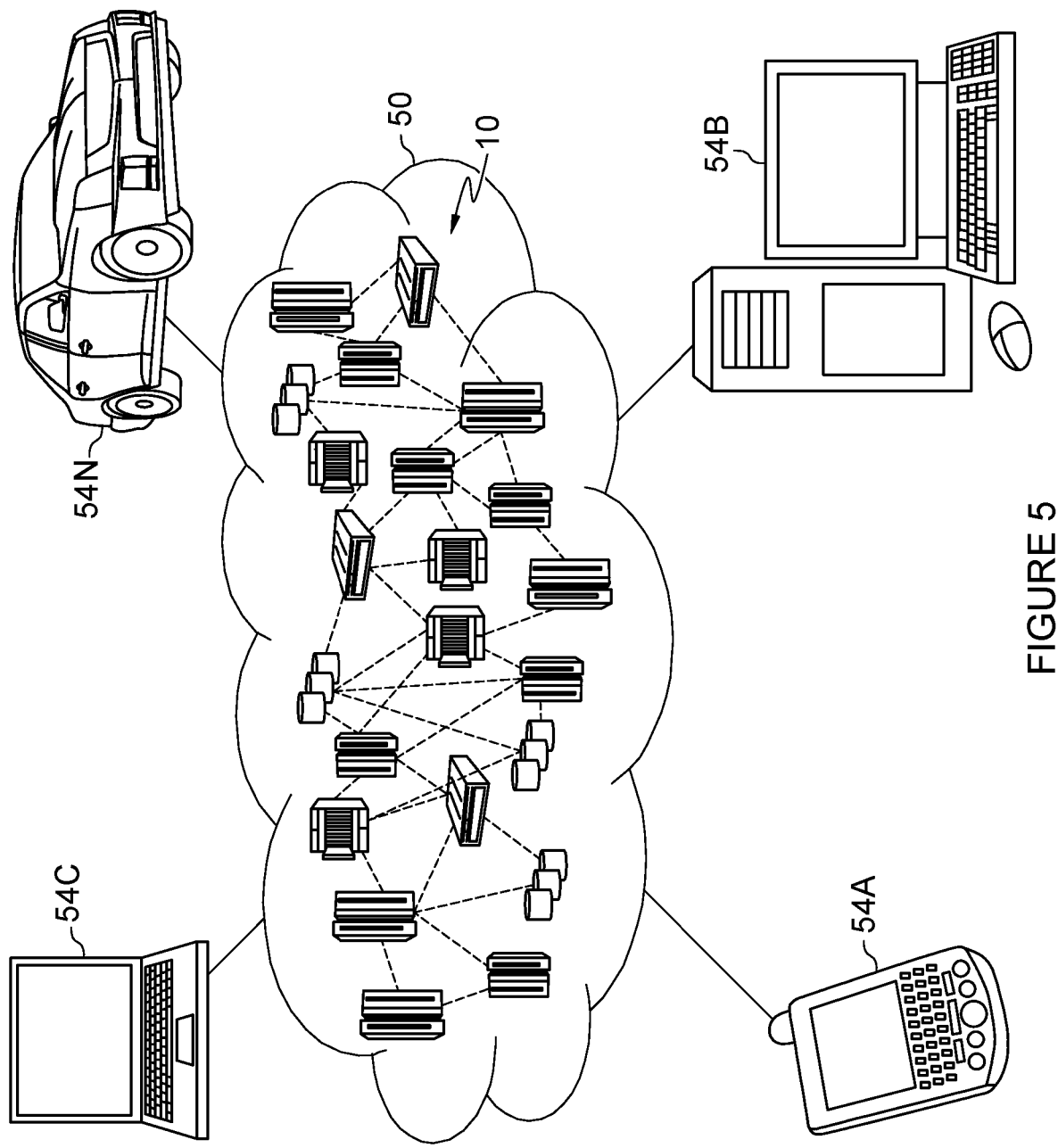
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and emoticon unlocking 96. Emoticon unlocking 96 may unlock emoticons relating to a specific skill based on the number of endorsements a user has for that specific skill. Emoticon unlocking 96 may link to a user's professional skills it in order to determine the number of endorsements that a user has.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for unlocking emoticons based on professional skills, the method comprising:
    receiving, by a computer, a user message or an emoticon database search term from a user, wherein a user's professional skill and an associated emoticon is determined based on the user message or the emoticon database search term;
    retrieving a plurality of user professional skills from a professional skills site;
    determining whether a number of endorsements for the user's professional skill exceeds a threshold value, wherein the threshold value is set for each emoticon in an emoticon database; and
    in response to determining that the number of endorsements for the user's professional skill does exceed the threshold value, performing an unlocking action that gives the user access to the associated emoticon in one or more messaging applications based on the determination.

2. The method of claim 1, further comprising:
    linking the one or more messaging applications to the professional skills site.

3. The method of claim 1, further comprising:
    displaying the associated emoticon in one or more messaging applications.

4. The method of claim 1, wherein performing the action further comprises:
    in response to determining that the number of endorsements for the user's professional skill does not exceed the threshold value, sending a message to the user stating that the associated emoticon is locked.

5. The method of claim 4, wherein the message to the user contains a plurality of information on how to unlock the associated emoticon and a number of endorsements that are needed for the user to unlock the associated emoticon.

6. The method of claim 1, wherein the plurality of user professional skills is manually entered into the professional skills site, voted on by at least one peer, or automated based on a specific membership to the professional skills site and a duration of the specific membership.

7. The method of 1, further comprising:
    sending an update to the user when the associated emoticon has been updated or changed.

8. A computer program product for unlocking emoticons based on professional skills, the computer program product comprising:
    one or more non-transitory computer-readable storage media and program instructions stored on the one or more non-transitory computer-readable storage media capable of performing a method, the method comprising:
    receiving, by a computer, a user message or an emoticon database search term from a user, wherein a user's professional skill and an associated emoticon is determined based on the user message or the emoticon database search term;
    retrieving a plurality of user professional skills from a professional skills site;
    determining whether a number of endorsements for the user's professional skill exceeds a threshold value, wherein the threshold value is set for each emoticon in an emoticon database; and
    in response to determining that the number of endorsements for the user's professional skill does exceed the threshold value, performing an unlocking action that gives the user access to the associated emoticon in one or more messaging applications based on the determination.

9. The computer program product of claim 8, further comprising:
    linking the one or more messaging applications to the professional skills site.

10. The computer program product of claim 8, further comprising:
    displaying the associated emoticon in one or more messaging applications.

11. The computer program product of claim 8, wherein performing the action further comprises:
    in response to determining that the number of endorsements for the user's professional skill does not exceed the threshold value, sending a message to the user stating that the associated emoticon is locked.

12. The computer program product of claim 11, wherein the message to the user contains a plurality of information on how to unlock the associated emoticon and a number of endorsements that are needed for the user to unlock the associated emoticon.

13. The computer program product of claim 8, wherein the plurality of user professional skills is manually entered into the professional skills site, voted on by at least one peer, or automated based on a specific membership to the professional skills site and a duration of the specific membership.

14. The computer program product of claim 8, further comprising:
    sending an update to the user when the associated emoticon has been updated or changed.

15. A computer system for unlocking emoticons based on professional skills, the computer system comprising:
    one or more computer processors, one or more computer-readable storage media, and program instructions stored on one or more of the computer-readable storage media for execution by at least one of the one or more processors capable of performing a method, the method comprising:

receiving, by a computer, a user message or an emoticon database search term from a user, wherein a user's professional skill and an associated emoticon is determined based on the user message or the emoticon database search term;

retrieving a plurality of user professional skills from a professional skills site;

determining whether a number of endorsements for the user's professional skill exceeds a threshold value, wherein the threshold value is set for each emoticon in an emoticon database; and in response to determining that the number of endorsements for the user's professional skill does exceed the threshold value, performing an unlocking action that gives the user access to the associated emoticon in one or more messaging applications based on the determination.

16. The computer system of claim 15, further comprising:
linking the one or more messaging applications to the professional skills site.

17. The computer system of claim 15, further comprising:
displaying the associated emoticon in one or more messaging applications.

18. The computer system of claim 15, wherein performing the action further comprises:
in response to determining that the number of endorsements for the user's professional skill does not exceed the threshold value, sending a message to the user stating that the associated emoticon is locked.

19. The computer system of claim 18, wherein the message to the user contains a plurality of information on how to unlock the associated emoticon and a number of endorsements that are needed for the user to unlock the associated emoticon.

20. The computer system of claim 15, wherein the plurality of user professional skills is manually entered into the professional skills site, voted on by at least one peer, or automated based on a specific membership to the professional skills site and a duration of the specific membership.

* * * * *